Patented May 15, 1923.

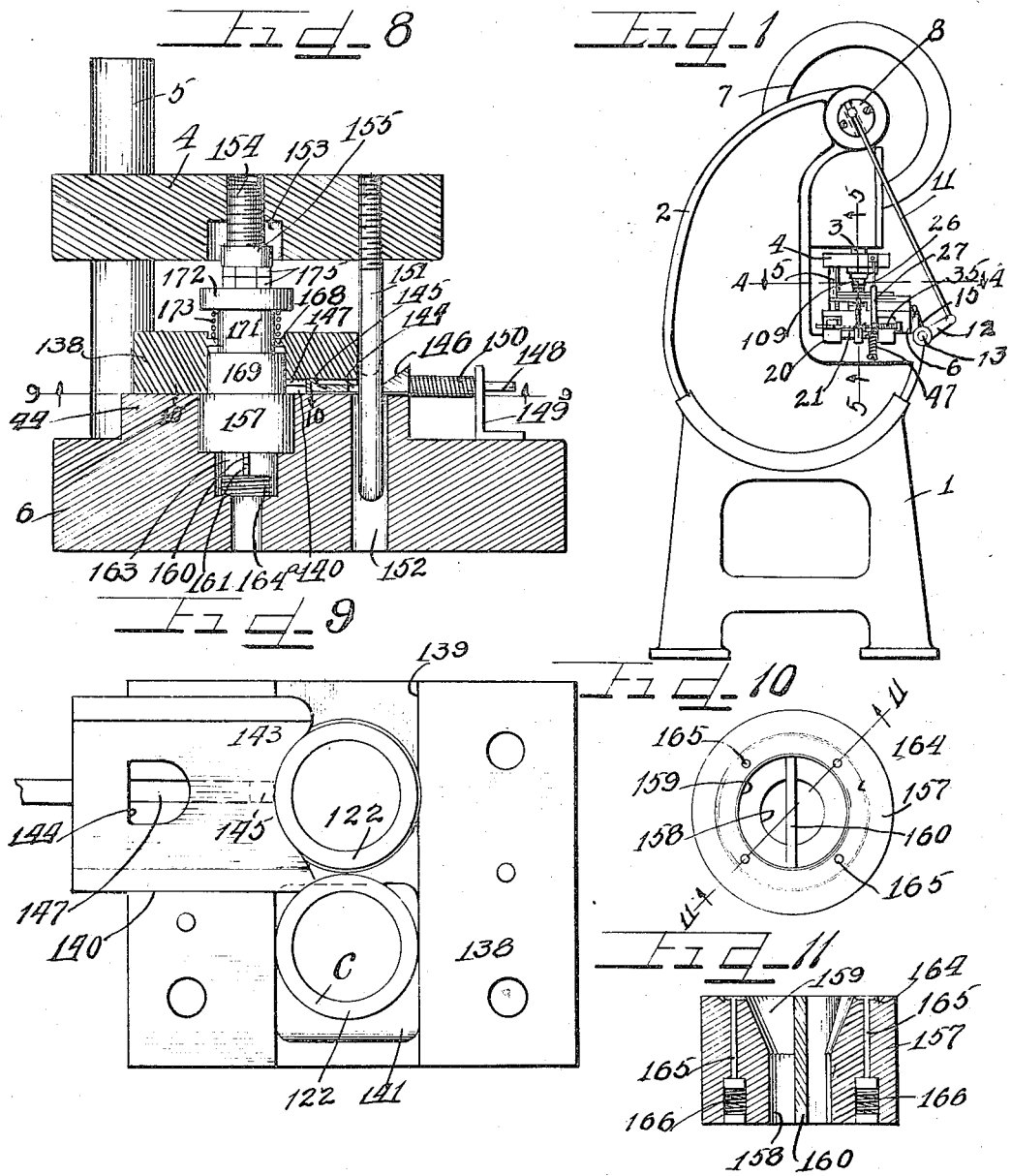

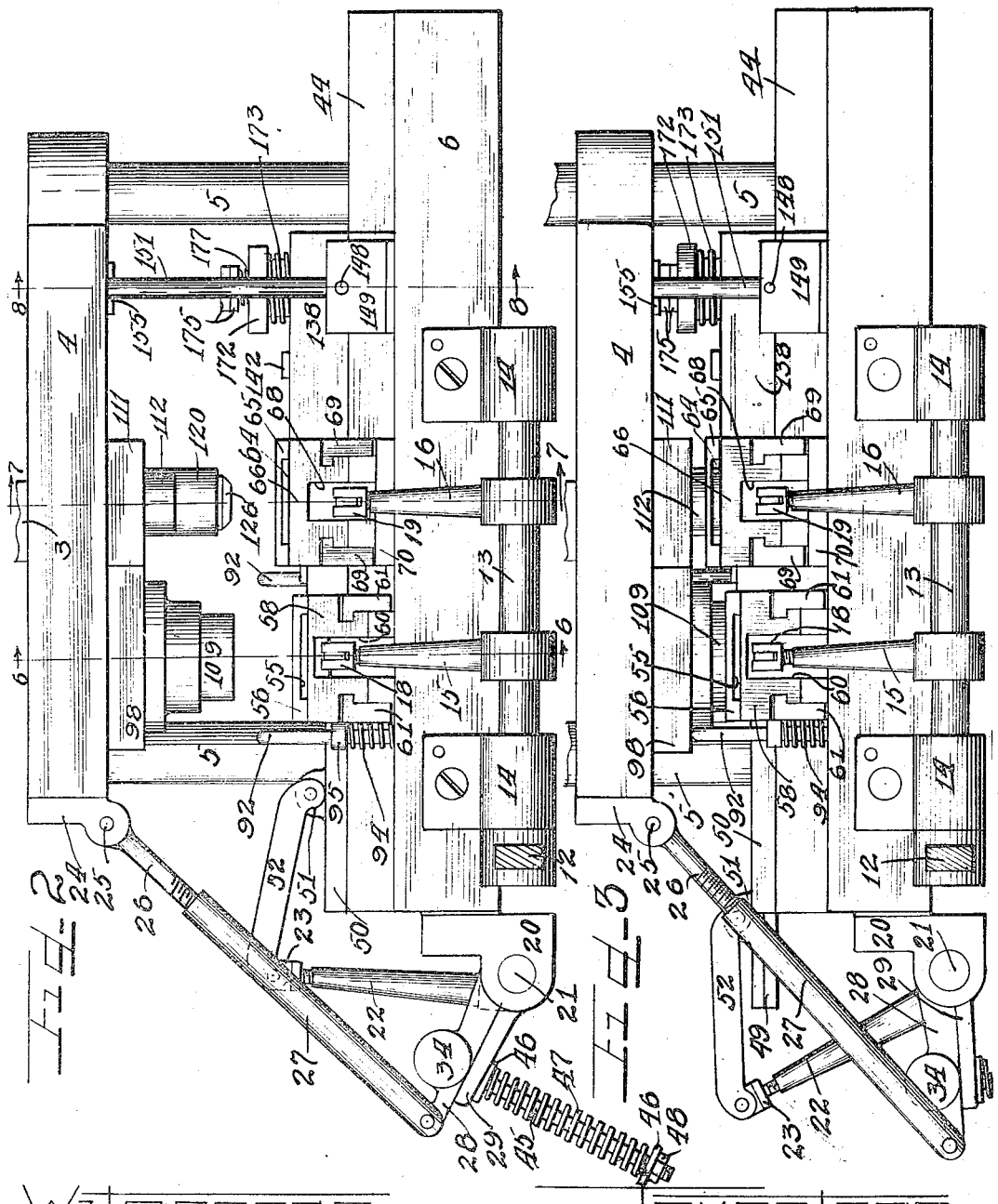

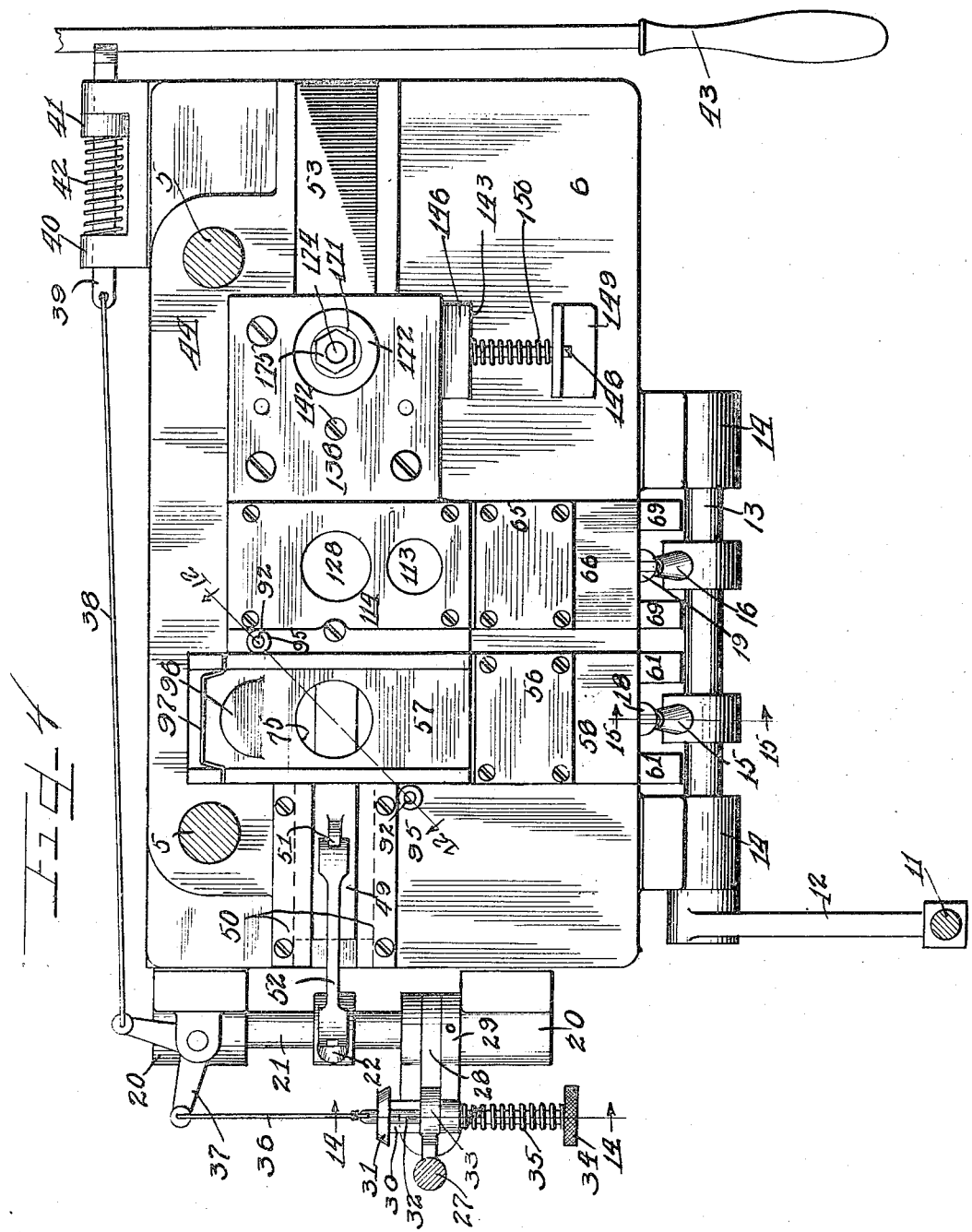

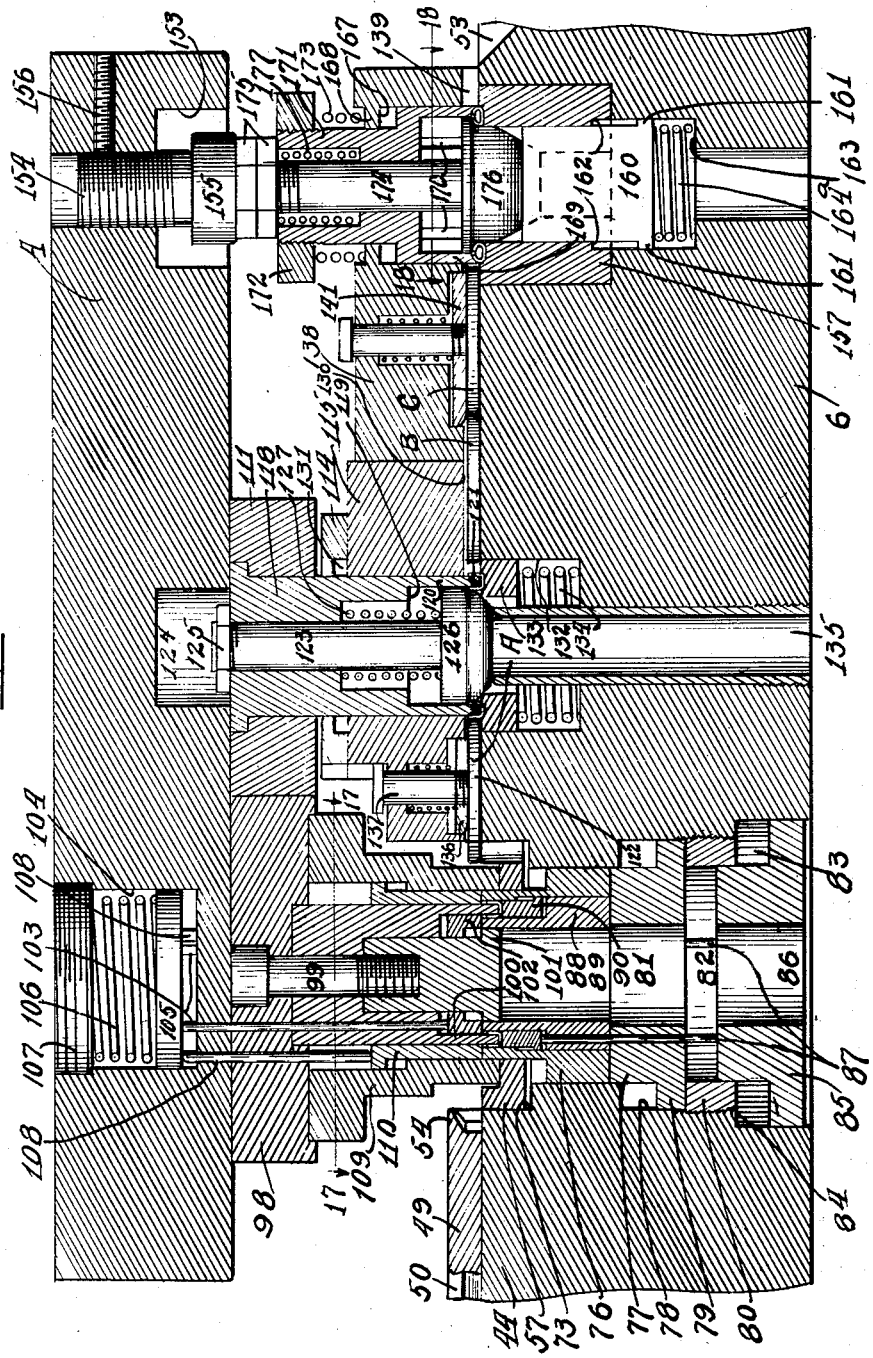

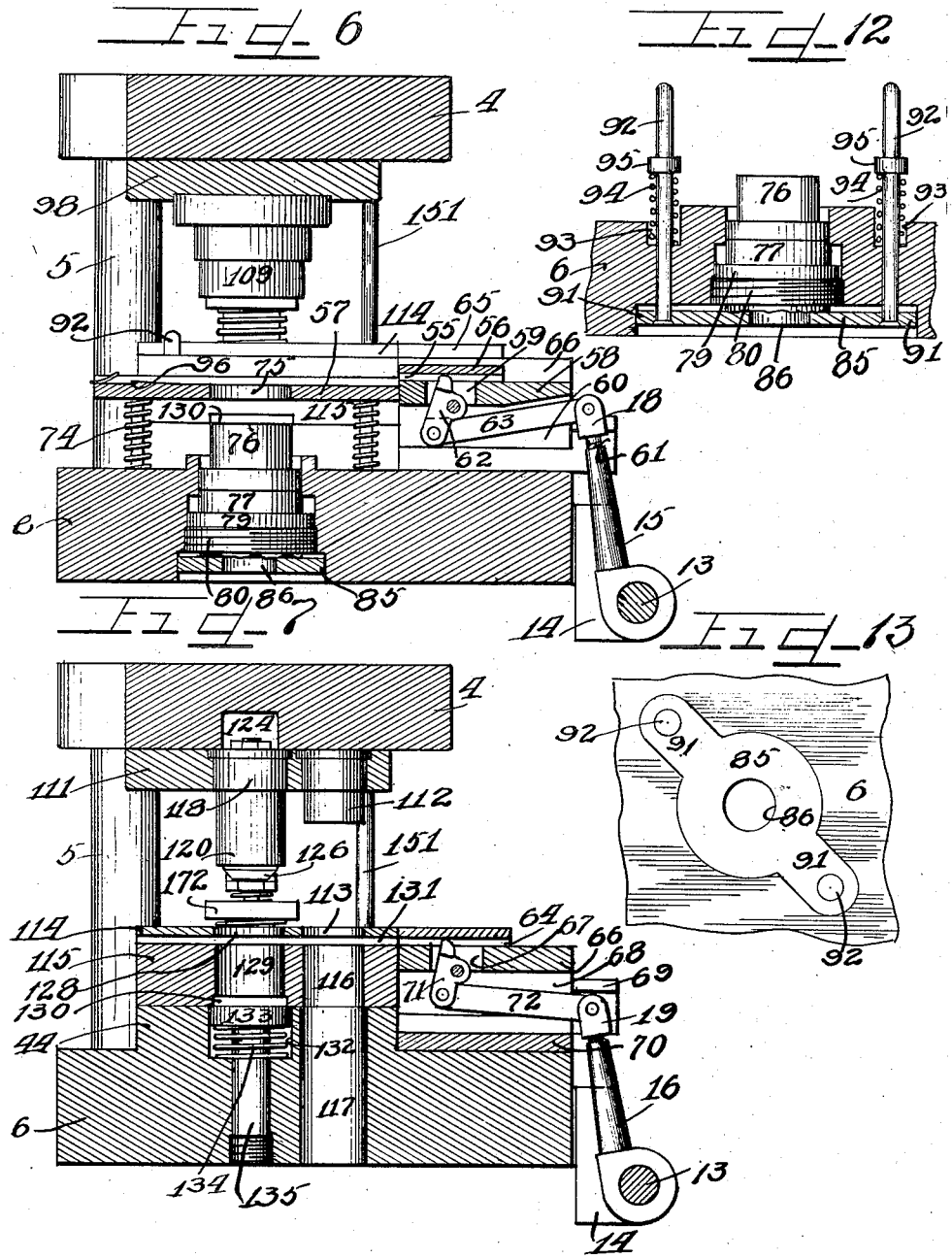

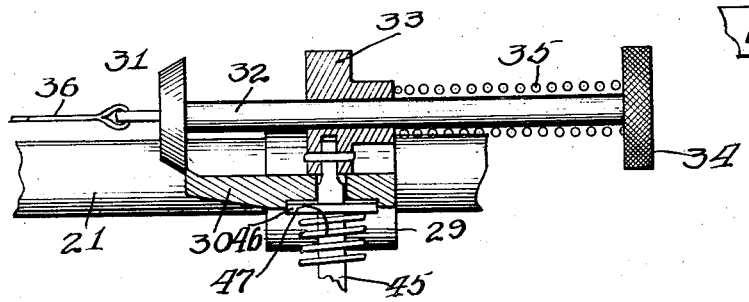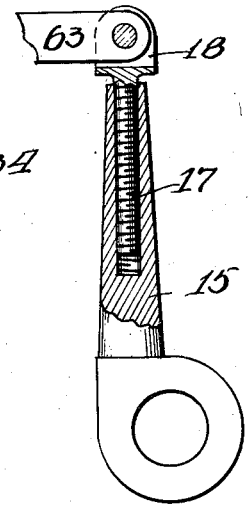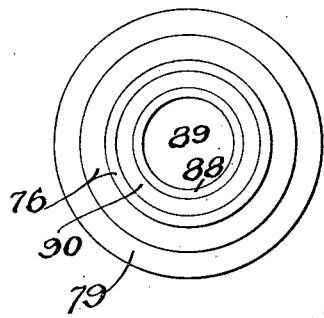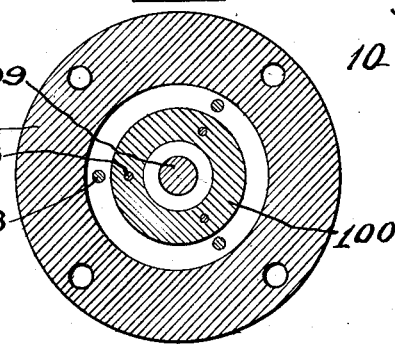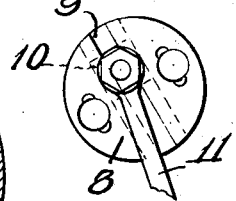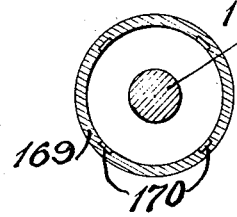

1,455,560

UNITED STATES PATENT OFFICE.

WILLIAM P. ZOMMER AND GEORGE F. MAGDZIARZ, OF CHICAGO, ILLINOIS, ASSIGNORS TO ILLINOIS GASKET CO., OF DES PLAINES, ILLINOIS, A CORPORATION OF ILLINOIS.

GASKET-MAKING MACHINE.

Application filed January 31, 1921. Serial No. 441,272.

*To all whom it may concern:*

Be it known that we, WILLIAM P. ZOMMER and GEORGE F. MAGDZIARZ, respectively a citizen of the Republic of Poland (who has declared his intention of becoming a citizen of the United States) and a citizen of the United States, and residents of the city of Chicago, in the county of Cook and State of Illinois, have invented certain new and useful Improvements in a Gasket-Making Machine; and we do hereby declare that the following is a full, clear, and exact description of the same, reference being had to the accompanying drawings, and to the numerals of reference marked thereon, which form a part of this specification.

This invention covers an improved type of a die and punch machine adapted to produce metal ring gaskets having asbestos cores. The machine is provided with means for feeding strips of metal and asbestos into the machine side by side to be cut and formed by punch and die mechanisms and fed through the machine by a feeding device which operates transversely of the material strips to move the cut metal channel rings into position to permit asbestos rings to be seated therein and then enclosed by folding the margins of the channel rings around the cores.

It is an object of this invention to construct a machine wherein positively acting punch and die mechanisms and a material feeding device are adapted to act upon materials to produce cored metal gaskets.

A further object of the invention is to provide a machine wherein metal gaskets are adapted to be automatically filled with ring cores and closed before being ejected into a discharge chute.

It is a further object of this invention to provide a punch machine having a plurality of groups of punches and dies adapted to co-act with material feeding mechanisms and with an ejecting device to automatically produce metal gasket rings having asbestos cores.

It is furthermore an object of this invention to construct a machine for first stamping and partially forming a metal gasket, after which an ejecting device moves the partially formed gasket into a position to be filled with a stamped asbestos core ring, the filled partially formed gasket is then again moved by said ejecting device into a position wherein the partially formed gasket is bent around the core to enclose the same before the completed gasket is discharged from the machine.

Another object of the invention is to provide a gasket making machine having an automatic release mechanism for stopping the operation of the machine when an obstruction is encountered by an ejector mechanism forming part of the machine.

A further object of this invention is to construct a gasket making machine wherein partially formed gasket members are adapted to be properly centered by centering means during their progress through the machine to permit the formation of substantially perfect cored gaskets.

It is also an object of the invention to provide a machine wherein levers are adapted to be operated to actuate link members which serve to operate feeding dogs to feed materials into the machine to be acted upon by punch and die mechanisms to produce cored metal gaskets which when formed are ejected from the machine by means actuated by the punch block.

It is an important object of this invention to provide a gasket making machine of simple and effective construction wherein the various mechanisms are positively acting to produce cored gaskets which are ejected from the machine by partially completed gaskets which are moved through the machine by an ejector device operable by the punch block of the machine.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a gasket making machine embodying the principles of this invention.

Figure 2 is a front elevation of the punch and die mechanisms showing the punch mechanisms in elevated normal position.

Figure 3 is a similar elevation showing the punch mechanisms in lowered punching position.

Figure 4 is an enlarged detail plan taken on line 4—4 of Figure 1.

Figure 5 is an enlarged detail section taken on line 5—5 of Figure 1 showing parts in elevation.

Figure 6 is a section taken on line 6—6 of Figure 2 with parts in elevation.

Figure 7 is a detail section taken on line 7—7 of Figure 2 showing parts in elevation.

Figure 8 is a detail section taken on line 8—8 of Figure 2 disclosing parts in elevation.

Figure 9 is an enlarged bottom plan view taken on line 9—9 of Figure 8.

Figure 10 is an enlarged detail plan of the finishing die taken on line 10—10 of Figure 8.

Figure 11 is a detail section taken on line 11—11 of Figure 10.

Figure 12 is a detail section partly in elevation taken on line 12—12 of Figure 4 with parts omitted.

Figure 13 is a bottom plan view thereof.

Figure 14 is an enlarged detail section with parts in elevation taken on line 14—14 of Figure 4.

Figure 15 is a fragmentary detail section of one of the feed levers taken on line 15—15 of Figure 4.

Figure 16 is a top plan view of the channel forming die mechanism.

Figure 17 is a detail section of the main punch mechanism taken on line 17—17 of Figure 5.

Figure 18 is a transverse section of the finishing punch taken on line 18—18 of Figure 5.

Figure 19 is an enlarged view of the slotted member mounted on the end of the machine crank shaft.

As shown in the drawings:

The gasket making machine comprises a machine frame 1 having formed or secured thereon an upwardly directed curved yoke arm 2 which supports a rotatable crank shaft. Connected to a crank pin of the machine crank shaft is the upper end of an upright shank or ram 3 the lower end of which is secured to a punch block or plate 4 having apertures therein to permit sliding engagement of the punch block 4 on a pair of upright guide posts or rods 5. The parts 5 are rigidly secured upon the rear portion of a table top or die block 6 which is supported on the top of the machine frame 1. Engaged on one projecting end of the crank shaft is a fly-wheel 7 adapted to receive a belt therearound for driving the machine. Secured to the other end of the crank shaft is a circular plate 8 provided with a diametric T-slot 9 within which is slidably engaged a block 10. Pivotally connected to the block 10 is the upper end of a connecting or operating rod 11 the lower end of which is pivotally connected to the outer end of an actuating lever or crank arm 12.

The crank arm 12 is secured on a front feed shaft 13 which is supported parallel to the front of the die block 6 by means of supporting brackets 14. Keyed or otherwise secured on the front shaft 13 between the brackets 14 are two internally threaded crank arms 15 and 16. Adjustably threaded into the levers or crank arms 15 and 16 are screws 17 having clevised heads 18 and 19 respectively on the upper ends thereof.

Secured on one end of the die block 6 are two spaced brackets 20 for supporting a rotatable side shaft 21. Secured on the side shaft 21 is an arm 22 having an adjustable clevised head 23. A gasket feeding mechanism is provided on the die block 6 and is adapted to be actuated by the punch block 4. An automatic release mechanism for the machine is provided and is operable when the gasket feeding mechanism fails to operate properly. Rigidly secured on one end of the punch block 4 is a clevised bracket 24 supporting a pin 25 on which is pivotally mounted the apertured end of a connecting screw 26. The screw 26 is threaded into an internally threaded connecting rod 27 one end of which is pivotally connected to the outer end of an arm 28, the other end of which is pivotally engaged on the side shaft 21 between the arms of a clevised lever 29. The lever 29 is rigidly secured on the side shaft 21 with the outer portion thereof disposed beneath the outer end of the pivoted arm 28. An apertured extension arm 30 is integrally formed on one side of the lever 29 the outer end of which serves as a stop for a disk 31 forming a part of an automatic release mechanism for the machine. The disk 31 is rigidly secured or integrally formed on one end of a rod 32 which is slidably supported in a passaged bearing member 33 integrally formed on the arm 28. A knurled head 34 is secured on the other end of the slidable rod 32. Engaged around the slidable rod 32 between the head 34 and the bearing member 33 is a coiled spring 35 which normally serves to hold the disk 31 engaged against the end of the stop 30 of the lever 29. Connected to the end of the rod 32 on which the disk 31 is secured is one end of a heavy wire or cable 36, the other end of which is connected to one arm of a bell-crank 37. The bell-crank 37 is pivotally supported on the rear bracket 20 as illustrated in Figure 4. Attached to the other arm of the bell-crank 37 is one end of a wire or cable 38 having the other end connected to one end of a latch bar 39. The latch bar 39 is slidably supported by the arms of a channel bracket 40 which is rigidly mounted on the rear of the die block 6. A collar 41 is rigidly formed on the latch bar 39 between the arms of the bracket 40. Wound around the latch bar 39 between one of the bracket arms and the collar 41 is a coiled spring 42 which serves to hold the latch bar 39 in projected position to engage a control lever 43. The control lever 43 is connected with a clutch governing the driving mechanism of the machine. When the control lever 43 is released by the latch bar 39 it acts to release the clutch to throw off the power thereby causing automatic stopping of the machine. Projecting upwardly through the aperture in the lever 29 is a rod 45 which is pivotally connected to the bearing member 33. A pair of washers or disks 46 are engaged on the lower portion of the rod 45 and are separated by a coiled spring 47. A nut 48 is secured on the lower end of the rod 45. The spring 47 acts to normally hold the arm 28 seated upon the lever 29.

The gasket feeding mechanism comprises an ejecting plate 49 which is slidable in a T-slot provided by securing parallel grooved strips 50 upon a rib 44 formed on top of the die block 6. An apertured lug 51 is formed on top of the ejector plate 49 and has pivotally connected thereto one end of a bridge link 52. The other end of the link 52 is pivotally connected to the clevised head 23 of the arm 22. A discharge chute 53 is provided in the rib 44 at the discharge side of the machine. The inner end of the ejector plate 49 is cut away to afford an overhanging flange 54 to engage over channel gasket rings when pushing the same toward discharge position through the machine.

When the machine is in operation a strip of metal is adapted to be automatically fed into the machine transversely of the die block 6 and in a groove 55 of a guide plate 56 and over a vertically movable grooved stripper plate 57 of the main die mechanism. The grooved plate 56 is part of a metal feed mechanism and is secured grooved side down upon the top of a slidable feed block 58 over an opening 59 therein. The feed block 58 is provided with a longitudinal opening or groove 60 which opens through the bottom of the block. The sides of the feed block 58 are grooved to slidably engage on angle guide rails 61 which are rigidly secured parallel to each other transversely on top of the front portion of the die block 6. Pivotally mounted within the opening 60 of the feed block 58 is a pawl or feed dog 62 the upper gripping end of which projects upwardly through the block opening 59 into the material guide groove 55 as illustrated in Figure 6. Disposed within the opening 60 of the block 58 is a connecting link or toggle 63 the inner end of which is pivoted on the lower end of the feed dog 62 while the outer end is pivotally connected in the clevised head 18 of the arm 15.

Another material feed mechanism is provided on the machine adapted to be actuated by the front shaft 13 and the arm 16 for the purpose of automatically feeding a strip of core material such as asbestos into the machine. The strip of asbestos is fed into the machine transversely of the die block 6 in a guide groove 64 formed on the under side of a guide plate 65. The guide plate 65 is secured upon the top of a slidable feed block 66 having a top opening 67 and a longitudinal groove 68 opening through the bottom of the feed block. The feed block 66 has side grooves to permit the same to be slidably engaged on parallel angle guide rails 69. The guide rails 69 are rigidly secured in place transversely of the die block 6 upon a filler plate 70. The strip of asbestos is thus permitted to be fed into the machine at a higher level than the strip of metal. Pivotally mounted within the feed block opening 68 is a pawl or feed dog 71 the upper gripping end of which projects upwardly through the block opening 67 into the material guide groove 64 as shown in Figure 7. Disposed within the block opening 68 is a connecting toggle or link 72 one end of which is pivoted on the lower end of the feed dog 71 while the other end is pivotally connected in the clevised head 19 of the arm 16.

Provided in the die block rib or raised portion 44 is a recess 73 for receiving the plate 57. Springs 74 are disposed below the plate 57 to normally hold the plate 57 in raised position with the groove thereof disposed in the plane of the feed block groove 55 to receive the strip of metal to be punched. The plate 57 is provided with an opening 75 to permit the plate 57 when lowered by the punch to fit over an outer die sleeve 76. The enlarged lower end of the die sleeve is seated upon a centrally apertured sleeve 77 provided in an opening 78 of the die block. The opening 78 is of a diameter greater than the diameter of the opening in which the die sleeve 76 is engaged. A flange 79 is formed on the sleeve 77. The lower portion of the opening 78 is threaded to receive a threaded ring 80. An opening 81 in the sleeve 77 registers with an opening 82 in the ring 80. The ring 80 supports the outer die sleeve 76 and the sleeve 77 in position. The lower end 83 of the opening 78 is of enlarged diameter to afford a shoulder 84. Slidably engaged in the opening 83 below the ring 80 is a disk or plate 85 having a discharge opening 86 therein below the opening 82 of the ring 80. Resting on the plate 85 are a plurality of pins or rods 87 which slidably project upwardly through openings in the sleeves 77 and 88.

Disposed within the outer die sleeve 76 is an inner die sleeve 88 having an axial discharge passage 89 therein registering with the opening 81. The upper portion of the inner die sleeve 88 is of reduced diameter to afford a circular opening between the upper parts of the die sleeves 76 and 88 to receive a flanged slidable gasket supporting die ring 90. The rods 87 slidably project upwardly through passages in the enlarged portion of the inner die sleeve 88 and have the upper ends thereof abutting the bottom of the die ring 90. The inner periphery of the upper portion of the outer die sleeve 76 is provided with a shoulder adapted to act as a stop for limiting the upward movement of the flanged die ring 90 as illustrated in Figure 5. The plate 85 has integrally formed thereon diametrically opposite arms 91 which engage in extensions of the opening 83. As shown in Figure 12, the arms 91 have guide rods 92 rigidly secured thereon. The guide rods 92 slidably project upwardly through vertical passages in the die block 6. The upper portions of the passages are enlarged to form recesses 93 to receive the lower ends of coiled springs 94 seated therein around the guide rods 92. The upper ends of the springs 94 bear against collars 95 rigidly secured on the upper projecting portions of the guide rods 92. The springs 94 act to normally hold the plate 85 in elevated position thereby holding the die ring 90 flush with the tops of the outer and inner die sleeves 76 and 88. As disclosed in Figures 4 and 6 the stripper plate 57 is provided with a raised curved lip or inclined boss 96 to the rear of the plate opening 75. A guide member 97 is disposed upon the rear portion of the stripper plate 57 to the rear of the boss 96 and has the ends thereof secured to the side flanges of said plate. The punched metal material leaving the machine passes over the boss 96 and beneath the guide member 97.

For co-action with the primary die mechanism a primary punch and shaping mechanism is provided the details of which are clearly illustrated in Figures 5 and 6 of the drawings. Rigidly secured on the bottom of the punch block 4 is a punch plate 98. Projecting downwardly through the punch plate 98 is a headed bolt 99 which also projects axially through a cylindrical shaper sleeve 100 and threads into a cylindrical plunger or punch 101. The lower end of the plunger or punch 101 is provided with an integral head adapted to fit into the discharge opening 89 of the inner die sleeve 88. Adjustably engaged on the punch 101 and within the shaper sleeve 100 is a flanged stripper ring 102 the flange of which is normally held between the punch head and the lower end of the shaper sleeve. The shaper sleeve 100 is positioned directly above the die ring 90. A plurality of pins or rods 103 rest on the stripper ring 102 and sildably project upwardly through passages in the shaped sleeve 100, the plate 98 and in the bottom of the punch block 4 and project into a recess or chamber 104 provided in said punch block. The upper ends of the rods 103 contact a circular disk or plate 105 movably engaged in said recess. A coiled spring 106 is seated upon the top of the plate 105 with the upper end thereof engaging against a plug 107 which is threaded into the upper end of the recess 104 to close the same and compress the spring 106. Also contacting the movable plate 105 are the upper ends of a plurality of pins or rods 108 which slidably project downwardly through passages in the punch block 4 and in the punch plate 98 into a space provided between the shaper sleeve 100 and a stepped punch cutter sleeve 109 which is rigidly secured to the bottom of the punch plate 98. The lower ends of the rods 108 rest on the flange top of a sleeve 110 slidably engaged between the shaper sleeve 100 and the punch cutter sleeve 109. A shoulder is provided in the inner periphery of the cutter sleeve 109 against which the flange of the sleeve 110 is adapted to engage to limit the downward movement of the sleeve 110.

A gasket core punch mechanism is provided in the punch block 4 and comprises a punch plate 111 which is rigidly secured on the bottom of the punch block 4 adjacent the main or primary punch plate 98. A primary cylindrical core punch 112 projects downwardly through the plate 111 and is in axial alignment with an opening 113 provided in a core stripper plate 114 rigidly secured transversely of the machine upon a core die block 115. The core die block 115 is rigidly secured on the top of the punch block rib 44 to the rear of the slidable feed block 66. A discharge opening 116 is provided in the core die block 115 directly below the stripper plate opening 113. Registering with the discharge opening 116 is a discharge opening 117 formed in the die block 6 to permit punchings to drop through the die block 6.

Also rigidly supported on the plate 111 is the upper end of a secondary cylindrical core punch 118 the lower projecting end of which is recessed at 119 to form a core punch ring or cutter sleeve 120 adapted to cut or punch out a core ring 121 and with the same operation seat the same in a channel gasket ring 122 formed by the main punch and die mechanisms with one operation. Slidably disposed axially within the core punch 118 is a stem 123 the upper threaded end of which projects into a recess 124 of the punch block 4. A nut 125 is engaged on the upper end of the stem 123. Rigidly secured on the lower end of the stem 123 is a conical or tapered centering head 126. A spring 127 is engaged within the punch chamber 119 around the stem 123 and rests upon the centering head 126 to normally hold the same projected. The stripper plate 114 is provided with an opening 128 which is axially disposed below the core punch ring 120 to permit the punch ring 120 to pass through the stripper plate 114 and through an opening 129 in the block 115. The block 115 is provided with a gasket ring guide slot 130. The under side of the stripper plate 114 is provided with a material guide groove 131 for permitting a strip of core material such as asbestos to pass from the feed groove 64 over the die block 115.

The core die mechanism is provided in a recess 132 formed in the rib 44 of the die block 6 and directly below the core punch ring 120 and the centering head 126. A plunger ring 133 is mounted in the recess 132 upon a coiled spring 134. The upper surface of the plunger ring 133 is provided with a circular groove for receiving a partly formed gasket ring seated therein as illustrated in Figure 5. The upper edge of the inner peripheral surface of the plunger ring 133 is chamfered to permit the centering head 126 of the core punch mechanism to seat upon the upper end of a tube or sleeve 135 which projects axially into the recess 132. The tube 135 has the lower end threaded in a vertical passage formed in the die block 6.

The core die block 115 is recessed at its bottom to receive a gasket ring centering shoe 136. The lower edge of the shoe 136 nearest the gasket ring die mechanism is beveled or chamfered to permit a gasket ring to pass thereunder during its progress through the machine. A spring is provided in the die block 115 and is engaged around a slidable bolt stem 137 which is attached to the centering shoe 136. The spring impelled shoe 136 acts to hold a partly formed channel gasket ring 122 in a position "A" of the die block groove 130 between the die mechanisms.

Rigidly secured upon the die block rib 44 adjacent the die block 115 is a punch block 138 having a gasket guide groove 139 formed in the bottom thereof in alignment with the groove 130 and the ejector plate 49. A groove 140 is also provided in the bottom of the block 138 at right angles to the groove 139. From the core die plunger ring 133 a filled channel gasket ring 122 is moved into the position "B" of Figure 5, and then into the position "C" below a spring impelled chamfered centering shoe 141. The shoe 141 is mounted in a recess of the block 138 below a spring engaged around a stem bolt 142 which is slidably engaged in an opening of the block 138. The spring impelled shoe 141 acts to hold a filled channel gasket ring 122 in the position "C" ready to be moved into finishing position. A centering plate 143 is slidably mounted on the top of the rib 44 to slide in the guide groove 140 of the block 138. The centering plate 143 is provided with an opening 144 and with an integral guide lug 145 to cause the plate to move in a predetermined path. The centering plate 143 is provided with an inclined surface 146 on the top thereof. The lug 145 of the plate 143 is slidable in a guide slot or groove 147 of the block 138 as illustrated in Figure 9. Secured on the front end of the centering plate 143 is a rod 148 the outer end of which slidably projects through an angle support or bracket 149 which is rigidly secured upon the top of the die block 6. A spring 150 is coiled around the rod 148 between the plate 143 and the bracket 149 to normally hold the centering plate projected inwardly to center a filled gasket ring in finishing position. Secured to the punch block 4 is a downwardly projecting stem or rod 151 the lower end of which is rounded. The rod 151 is axially aligned with a vertical passage or opening 152 provided in the die block 6 and the rib 44 as illustrated in Figure 8. The rounded lower end of the rod 151 is adapted to coact with the inclined surface 146 of the centering plate 143 to cause retraction of the plate 143 against the action of the spring 150 before the finishing punch mechanism reaches its lowermost position.

An opening or recess 153 is provided in the punch block 4 and adjustably threaded into said opening is a bolt 154 having a head 155 which projects below the lower surface of the punch block. A set screw 156 is provided to hold the bolt 154 locked in an adjusted position. A gasket finishing die mechanism is provided and consists of a finishing die sleeve 157 which is seated in a recess provided for the purpose in the rib 44. The upper end of the finishing die sleeve 157 is provided with a circular forming groove 164 for receiving a partially formed channel gasket ring having a core ring seated therein. The lower portion of the die sleeve 157 has a cylindrical opening 158 the upper end of which communicates with a conical opening 159. Diametrically opposite guide grooves are provided in the die sleeve 157 to slidably receive a vertical plate 160. Lugs 161 are integrally formed on the lower corners of the plate 160 and are adapted to contact shoulders 162 formed in the die sleeve 157 to limit the upward movement of said plate 160. Seated in an opening 163 of the die block 6 and below the slidable plate 160 is a coiled spring 164ᵃ which normally acts to hold the plate 160 elevated in said die sleeve to permit a channel gasket ring to be moved into place to seat in the finishing groove of the die sleeve 157 without danger of the advance portion of said gasket ring dropping into the sleeve opening 159. As illustrated in Figure 11 rods 165 are slidably mounted in openings in the die sleeve 157 and are adapted to be projected into the finishing groove 164 by springs 166, when finishing punch mechanisms are released. The rods 165 thus serve as a means for raising a finished gasket out of the finishing groove 164 of the die sleeve 157 to permit discharge of a finished gasket into the discharge chute 53.

The finishing punch mechanism is supported by a block 138 and is adapted to be actuated by the head 155 of the screw bolt 154 carried by the punch block 4. The block 138 is provided with a recess 167 having a flange or ring 168 therein. Engaged in the recess 167 below the flange 168 is a finishing punch sleeve 169 the lower end of which is provided with a concave finishing surface. The finishing punch sleeve 169 is provided with a plurality of vertical grooves 170 in the inner surface thereof. Integrally formed on the upper end of the finishing punch sleeve 169 is a passaged cylindrical head 171 which projects upwardly through the flange 168 above the block 138. A collar 172 is threaded upon the upper end of the head 171 of the punch sleeve. Seated upon the flange 168 is a spring 173 which is wound around the sleeve head 171 below the collar 172. The spring 173 acts to hold the finishing sleeve 169 in elevated release position when the punch block 4 is in elevated position. Slidably projecting through the head 171 of the die sleeve 169 is a plunger rod or stem 174 the upper projecting end of which has a pair of nuts 175 threaded thereon. Secured on the lower end of the rod 174 is a circular centering plunger 176 which is slidable in the finishing sleeve 169. The lower portion of the centering plunger 176 is of conical or tapered form. The upper portion of the centering plunger 176 is flanged to provide a curved finishing surface adapted to co-act with the concave finishing surface of the sleeve 169 to finish a cored gasket as illustrated in Figure 5. Seated in the upper recessed end of the finishing sleeve head 171 is a spring 177 which is engaged around the plunger rod 174 below the nuts 175. The spring 177 acts to hold the centering plunger 176 in elevated position within the finishing sleeve 169.

The operation is as follows:

The machine of this invention is for making metal gasket rings having core rings seated therein made of asbestos or other suitable material. The operation of the machine is controlled by a clutch mechanism (not shown) but adapted to be operated by the starting lever 43. To start the machine the starting lever 43 is pulled downwardly to throw in the clutch to permit the fly-wheel 7 to be rotated from a source of power. When the lever 43 is pulled down it strokes the latch bar and causes retraction of the same. When the lever has passed below the latch bar 39, said latch bar springs outwardly over the lever to hold the clutch thrown in. Rotation of the fly-wheel 7 causes rotation of the crank shaft and the slotted plate 8 attached thereto. The connecting rod 11 is thus reciprocated and acts to swing the arm 12 back and forth to rock or partially rotate the front feed shaft 13. The two feed arms 15 and 16 are thereby simultaneously operated to swing back and forth. Rotation of the fly-wheel 7 causes rotation of the machine crank shaft to which the upper end of the punch shank 3 is connected. The punch shank 3 is operated by the machine crank shaft and serves to reciprocate the main punch block 4 on the guide posts 5.

Operation of the main punch block 4 causes operation of the adjustable connecting rod 26—27 which in turn acts to swing the pivoted arm 28 downwardly against the lever 29 against the action of the spring 47. The lever 29 is swung downwardly by the arm 28 and rocks or partially rotates the side shaft 21. The arm 22 is operated by the side shaft 21 and causes the link 52 to slidably actuate the ejector plate 49. It will be noted that the material feeding mechanisms are actuated from the machine crank shaft through the connecting rod 11 while the ejector mechanism is operated by the main punch block 4 through the adjustable connecting rod 26—27.

As illustrated in Figures 6 and 7 a strip of metal is adapted to be slidably engaged over the feed block 58 in the guide groove 55 of the guide plate 56. From the feed block 58 the strip of metal passes over the stripper plate 57 and the boss 96 thereof and under the guide member 97 on the stripper plate. A strip of asbestos is inserted over the feed block 66 in the guide groove 64 of the guide plate 65. From the feed block 66 the strip of asbestos passes through the groove 131 over the core die block 115 and beneath the stripper plate 114. The feed dogs 62 and 71 engage the bottom surfaces of the metal strip and the strip of asbestos respectively.

The feed mechanisms being connected with the machine crank shaft are operated in advance of the ejector mechanism which is connected to be retracted when the main punch block 4 is lowered. When the machine is operating the front shaft 13 acts to throw the two feed arms 15 and 16 outwardly from the positions shown in Figures 6 and 7 thereby causing the upper ends of the feed dogs 62 and 71 to swing inwardly to grip against the under surfaces of the strips of metal and asbestos respectively. The material strips are thus fed inwardly a predetermined amount between the punch and die mechanisms.

With the descent of the main punch block 4 the connecting rod 26—27 causes the arm 28 to depress the arm 29 whereby the side shaft 21 moves the arm 22 outwardly to slide the ejector plate 49 outwardly into its retracted position as shown in Figure 3. The punch mechanisms are thus permitted to act upon the material strips out of which the gaskets are to be made. The machine is set so that an advance of the materials by the feeding mechanisms is made before the punch mechanisms reach their operating positions. With the materials in proper position and with the ejector plate 49 retracted, the punch block mechanisms descend into co-acting relation with the respective die mechanisms on the die block as shown in Figure 5.

It will thus be noted that with the descent of the metal punch mechanism the outer punch sleeve 109 and the punch plunger 101 co-act with the die sleeves 76 and 88 to punch out a circular metal disk ring while the punch shaper sleeve 100 acts at the same time on said circular disk ring to force the same downwardly between the die sleeves 76 and 88 against the movable die ring 90 which is forced downwardly. By forcing the cut metal disk ring downwardly between the die sleeves 76 and 88 a circular U-cross-sectioned or channel gasket ring 122 is formed with one operation. The punch plunger 101 punches out a circular disk of metal which drops downwardly out of the machine through the registering discharge openings 89, 81, 82 and 86. With the descent of the outer punch sleeve 109 the die plate 57 is depressed against the action of the spring 74. The portion of the strip of metal from which the gasket channel ring has been punched is slightly depressed or deflected with the lowering of the die plate 57 by the descent of the outer punch sleeve 109.

As the punch block 4 descends the punch plate 98 contacts the upper ends of the rods 92 and pushes said rods downwardly lowering the plate 85 and at the same time compressing the springs 94. With the lowering of the plate 85 the ejector rods 87 are also lowered as the punch shaper sleeve 100 depresses the die ring 90.

With the upward movement or return stroke of the punch mechanisms the punch shaper sleeve 100 is first withdrawn from the channel gasket ring 122 just formed while the ring 122 remains between the two stationary die sleeves 76 and 88 due to the stripping action of the punch sleeve 110 and the ring 102. To release the formed channel gasket ring and raise the same to the level of the upper surface of the die block rib 44 the compressed springs 94 act automatically to elevate the plate 85 to its normal position thereby causing upward sliding movement of the ejector rods 87 which in turn elevate the die ring 90 to force the channel gasket ring upwardly out of engagement with the die sleeves.

At the same time that a formed channel gasket ring is elevated by the die ring 90, the upward movement of the main punch block 4 causes the arm 28 to swing upwardly from the position shown in Figure 3 into the position shown in Figure 2. The spring 47 being compressed acts automatically to move the lever 29 upwardly thereby actuating the side shaft 21 which in turn throws the arm 22 inwardly whereby the link 52 acts to slide the ejector plate 49 inwardly over the top of the die block rib 44. The ejector plate 49 approaches and slides under the die plate 57 and the strip of metal thereon since the action of the compressed springs 74 act with the raising of the punch block 4 to return the plate 57 to its normal elevated position. The ejector plate 49 is thus permitted to have the overhanging flange 54 thereof engage over one side of the elevated channel gasket ring to move the same into the position "A" of Figure 5 below the spring impelled retaining shoe 136. The retaining shoe 136 acts to prevent the channel gasket ring from returning with the ejector plate or from prematurely moving into the field of operation of the core punch and die mechanisms.

Simultaneous with the descent of the punch mechanism for punching a metal channel gasket ring 122, the core punch mechanisms also descend. The primary core punch 112 is forced downwardly through the stripper plate opening 113 through the strip of asbestos and into the die block opening 116, thereby punching a circular disk from the strip of asbestos. The punched out asbestos disk is discharged from the machine through the discharge opening 117.

With the next descent of the punch mechanisms the ejector plate 49 is automatically retracted into its normal position free of the punch and die mechanisms. At the time the ejector plate is being retracted the material feed mechanisms are again operated to cause the dogs 62 and 71 to grip the strips of materials and advance the same into the machine a predetermined amount ready for the second punching operation. The hole punched in the strip of asbestos by the punch 112 is now positioned to register beneath the stripper plate opening 128 and above the opening 129 in the block 115. As the core punch mechanism descends the centering plunger head 126 first projects through the stripper plate opening 128 and through the punched opening in the strip of asbestos to properly center the asbestos. The descending core cutter sleeve 120 punches out a core ring from the asbestos and pushes the ring downwardly through the die block opening 129.

After the punching out of a second channel gasket ring 122, the ejector plate 49 acts with the return stroke of the punch mechanisms to push the second gasket ring from between the gasket punch and die mechanisms into the position "A." The second gasket ring acts to move the first gasket ring from the position "A" onto the core die ring 133 to seat in the groove thereof. When a channel gasket ring 122 is seated in position on the core die ring 133, the descending core cutter sleeve 120 after cutting or punching out an asbestos core ring forces the same downwardly through the die block opening 120. The centering plunger head 126 first projects through the channel gasket ring 122 and centers the same on the die ring 133 as illustrated in Figure 5, so that the cutter sleeve 120 is permitted to seat the asbestos core ring 121 in the channel gasket ring 122. The stationary sleeve 135 serves to limit the downward movement of the centering plunger head 126.

As the next channel gasket ring is pushed toward discharge position it causes the channel gasket ring in position "A" to move the filled gasket ring on the die ring 133 into the position "B" of Figure 5. The following operation of the machine causes the filled gasket ring to be moved into position "C" beneath the spring controlled shoe 141 ready to be moved into the finishing position onto the finishing die sleeve 157 with the next operation of the machine. As a filled channel gasket ring is pushed into finishing position the spring 164ª acts to hold the plate 160 elevated so that the gasket ring will not tip as it advances over the opening in the die sleeve 157. With a filled channel gasket ring seated in the finishing groove 164 of the die sleeve 157, the descending punch block 4 acts to force the projecting bolt head 155 against the upper nut 175 to start the downward movement of the centering plunger head 176 in advance of the finishing punch members. The descending plunger head 176 projects through the filled channel gasket ring and centers the same on the die sleeve 157. With the continued descent of the punch block 4 the nuts 175 engage the upper end of the finishing sleeve 169 and forces the same downwardly with the centering plunger head 176. The concave lower surface of the finishing sleeve 169 together with the concave surface below the flange of the centering head 176 form a finishing groove which acts to simultaneously bend the outer and the inner upright flanges of the incomplete filled gasket ring toward each other and around the asbestos core ring 121 to enclose the same and form a completed cored gasket. As the next partially formed filled gasket ring is moved from position "C" into the finishing position the gasket just completed is pushed off of the finishing die sleeve 157 out of the discharge end of the guide slot 139 and into the gasket discharge chute 53. When a gasket is finished on the die sleeve 157 and the finishing punch members are retracted the upward movement of the centering head 176 into the finishing sleeve recess causes the air in said recess above the head 176 to be forced out of the outlet passages or grooves 170 to blow the finished cored gasket free from the upwardly moving finishing punch members to seat on the top of the finishing die sleeve 157 in position to be ejected.

It will be noted that after the machine has been started that with each descent of the punch mechanisms a completed cored gasket is ejected from the machine into the discharge chute 53. The operations of the various co-acting punch and die mechanisms are accurate and positive.

An important action of the machine is the forming of a metal channel gasket ring with one operation. The core punch mechanisms are adapted with one operation to first centralize the asbestos material, punch an asbestos core ring, center a channel gasket ring on the core die ring 133 and then force the punched core ring downwardly to seat in the centered channel gasket ring.

As a filled gasket ring 122 is moved from position "C" onto the finishing die sleeve 157 to be finished it is engaged by the curved inner end of the finishing centering plate 143 which is moved inwardly by the action of the spring 150. The centering plate 143 not only serves to center a filled channel gasket ring 122 on the finishing die sleeve 157 but also acts as a stop to prevent a channel gasket ring in position "C" from prematurely advancing into the field of operation of the finishing mechanisms. When the punch block 4 is descending the lower rounded end of the rod 151 engages against the inclined surface 146 of the plate 143 thereby causing outward movement of said plate just before the finishing punch mechanisms engage the filled channel gasket ring to finish the same. The centering plate 143 is held in the retracted position of Figure 8 during a finishing operation by the rod 151 which projects through the plate opening 144 into the die block opening 152. The spring impelled rods 165 shown in Figure 11, are provided for elevating a finished cored gasket out of the finshing groove of the finishing die sleeve 157 after the retraction of the finishing punch mechanisms, so that the finished gasket may be moved out of the field of operation of the finishing mechanisms into discharge position by a channel gasket ring leaving the position "C".

A strip of metal being fed into the machine, over the adjustable plate 57, is prevented from being drawn outwardly by means of the boss 96 shown in Figures 4 and 6. The punched portion of the strip of metal when fed through the machine slides upwardly over the inclined boss 96 and under the retainer strap 97. When a hole in the strip of metal registers with the boss the strip of metal is permitted to drop to engage behind the raised portion of said boss thereby preventing the strip of metal from being pulled outwardly toward the front of the machine.

If during the operation of the machine channel gasket rings become jammed together or clog the machine so that the ejector plate 49 is prevented from moving inwardly by the action of the spring 47 when the punch block 4 ascends the machine is stopped automatically. This is accomplished due to the fact that when the ejector plate is obstructed and is not permitted to slide inwardly the arm 28 is pulled upwardly away from the arm 29 by the connecting rod 26—27 when the punch block 4 moves upwardly. Since the spring 47 is not strong enough to act against the obstruction in the machine the movement of the arm 28 upwardly away from the arm 29 carries the disk 31 out of engagement with the stop 30 of the arm 29. As the disk 31 disengages the stop 30 the spring 35 acts automatically to slide the rod 32 forwardly thereby tensioning the wire 36 and operating the bell-crank 37. Operation of the bell-crank tensions the wire 38 and pulls the latch bar 39 inwardly against the action of the spring 42 and out of engagement with the starting clutch control lever 43. Release of the starting lever 43 permits the same to move upwardly into normal position to throw out the machine starting clutch thereby automatically stopping the operation of the machine. The obstructions in the machine may now be removed to permit proper operation of the ejector plate 49.

Referring to Figure 5 attention is directed to the fact that the finishing punch mechanisms are supported by the block 138 which is secured on the die block rib 44. Said finishing punch mechanisms while supported on the die block 6 are operable by the head 155 of the screw bolt 154 carried by the machine punch block 4.

We are aware that numerous details of construction may be varied through a wide range without departing from the principles of this invention, and we therefore do not purpose limiting the patent granted otherwise than necessitated by the scope of the appended claims.

We claim as our invention:

1. An automatic gasket making machine comprising die and punch mechanisms for forming channel gasket rings with one operation, core die and punch mechanisms for punching core rings and seating the same within the channel gasket rings, a movable ejector member for moving the channel gasket rings into position to receive the core rings, and finishing die and punch mechanisms for forming the channel gasket rings around the core rings to form cored gaskets.

2. A gasket making machine comprising co-acting die mechanisms and punch mechanisms, means for operating said punch mechanisms to produce gasket rings and core rings, a slidable ejector plate, spring means connected with said plate for causing the same to slide inwardly to push the gasket rings into position to be filled by said core rings, means connected with said punch mechanisms for retracting the ejector plate, and means for shaping said gasket rings around the core rings.

3. A gasket making machine comprising co-acting die mechanisms and punch mechanisms, means for operating said punch mechanisms to produce gasket rings and core rings, a spring controlled slidable ejector plate adapted to slide inwardly to push the gasket rings into position to be filled by said core rings when the punch mechanisms are ascending, said filled gasket rings adapted to be moved along by one another, means adapted to be operated when the punch mechanisms descend to cause retraction of the plate, and die and punch mechanisms for shaping the gasket rings around the core rings to form completed cored gaskets.

4. An automatic gasket making machine comprising die mechanisms, punch mechanisms adapted to co-act therewith, feeding mechanisms for feeding materials between the die and punch mechanisms, a gasket ring push device, means for operating said punch mechanisms to punch out gasket rings and core rings from said materials, said operating means also serving to operate said feeding mechanisms, means operable by said punch mechanisms adapted to retract said push device during a punching operation, means adapted to act automatically when the punch mechanisms move upwardly, to cause the push device to slide inwardly to push the gasket rings into position to be filled by said core rings, and mechanisms for shaping the gasket rings to enclose the core rings.

5. A gasket making machine embracing die mechanisms and punch mechanisms, means for feeding materials into the machine in the same direction to be acted upon by said die and punch mechanisms, means for operating the punch mechanisms to cause punching of gasket rings and core rings from said materials, a spring controlled slidable member for pushing the gasket rings into position to have the core rings seated therein, finishing die and punch mechanisms for shaping the gasket rings around the core rings seated therein, and a discharge chute for receiving the completed gaskets discharged by the operation of said slidable member.

6. An automatic gasket making machine comprising a plurality of die mechanisms, a plurality of punch mechanisms, material feeding devices for feeding materials between said die mechanisms and said punch mechanisms, operating means for actuating said feeding devices and said punch mechanisms to cause the punch mechanisms to punch gasket parts from said materials, and spring controlled slidable means to cause the gasket parts to move one another through the machine to permit assembly of said gasket parts to form gaskets.

7. An automatic gasket making machine comprising a frame, die mechanisms mounted thereon, punch mechanisms movably supported on said frame above said die mechanisms, feed blocks on said frame, dogs therein for engaging and feeding materials into said machine, means on said frame for operating said punch mechanism and said feed blocks to cause gasket rings and core rings to be punched from said materials, said frame having a guide slot therein, a spring controlled ejector member slidable in said slot for moving the gasket rings through the slot toward discharge position and into place to have core rings seated therein, said ejector member adapted to be retracted with the return movement of said punch mechanisms, a finishing die mechanism on said frame for receiving the gasket rings having core rings seated therein, means for automatically centering the filled gasket rings on said finishing die mechanism, a finishing punch mechanism adapted to co-act with said finishing die mechanism for completing the forming of said gasket rings around the core rings to form finished gaskets, means for blowing finished gaskets free of said finishing punch mechanisms, and a discharge chute forming part of the machine frame for receiving the finished gaskets which are ejected by the gasket rings moved through the machine by said ejector member.

8. A gasket making machine comprising a plurality of die mechanisms, a plurality of punch mechanisms to co-act therewith for punching gasket rings and core rings out of materials, material feed blocks, dogs mounted therein to co-act with the feed blocks to cause the materials to be fed into the machine, and a spring controlled slidable ejector plate for moving the gasket rings into position to receive the core rings seated therein and then into position to have the gasket rings formed around the core rings to form completed gaskets.

9. The combination with die and punch mechanisms, of a movable punch block for supporting the punch mechanisms, slidable feed blocks over which materials to be punched pass, feed dogs in said blocks to act on said materials to feed the materials into the machine to permit gasket rings and core rings to be punched from the materials by said die and punch mechanisms, a spring controlled ejector mechanism for pushing the gasket rings through the machine, means for operating the punch block and the feed blocks, and means connected with said ejector mechanism and with said punch block adapted to retract the ejector mechanisms when the punch block is lowered.

10. The combination with die and punch mechanisms, of a frame supporting the same, slidable feed blocks over which materials to be punched pass, feed dogs in said blocks to feed the materials into the machine to permit gasket rings and core rings to be punched from the materials by the die and punch mechanisms, a spring controlled slidable ejector plate for first pushing the gasket rings into position to receive the core rings seated therein and then pushing the gasket rings into position to have the gasket rings formed around the core rings to form finished gaskets, shafts supported on said frame at right angles to one another, arms on said shafts, links pivoted to said arms and connected with said feed dogs and with said ejector plate, and means for operating said punch mechanisms and said shafts.

11. An automatic gasket making machine embracing punch and die supports, punch and die mechanisms thereon for automatically forming cored gaskets, a slidable ejector plate, a link pivotally connected thereto, a shaft mounted on the machine, an adjustable arm on said shaft pivotally connected with said link, an arm pivoted on said shaft, an adjustable connecting rod pivoted to said pivoted arm and to said punch support, a lever rigidly secured to said shaft below the pivot arm, a rod on said pivoted arm projecting through said lever, and a spring on said rod contacting the lever and adapted to cause said ejector plate to slide inwardly to cause ejection of cored gaskets when the punch support is elevated to move the pivoted arm away from said lever, said punch support when descending adapted to cause the connecting rod to swing the pivoted arm against the lever to swing the same downwardly whereby the shaft is operated to cause the adjustable arm and the link to retract the ejector plate.

12. In a gasket making machine, the combination with a die mechanism, of a punch mechanism adapted to co-act therewith to form a channel gasket ring by a single operation of said punch mechanism, and means slidable between the die mechanism and said punch mechanism after the forming of a gasket ring to push the formed gasket ring out from between said die mechanism and said punch mechanism.

13. In a gasket making machine the combination with a die mechanism, of a punch mechanism adapted to co-act therewith to form a channel gasket ring by a single operation of said punch mechanism, a material feed mechanism for feeding a material into the machine, a slidable ejector plate connected with the punch mechanism to be retracted thereby during a working stroke of said punch mechanism, operating means for actuating said feed mechanism and said punch mechanism to cause the material to be fed between the die mechanism and the punch mechanism in advance of the punching operation, and a spring adapted to cause said ejector plate to push the punched gasket ring out from between the die mechanism and said punch mechanism when the punch mechanism is elevated.

14. In a gasket making machine the combination with a primary die mechanism, a primary punch mechanism adapted to co-act therewith to punch out a channel gasket ring from a material with a single operation of the punch mechanism, a secondary die mechanism, means adapted to be slidably projected between the primary die mechanism and the primary punch mechanism to push the punched channel gasket ring onto the secondary die mechanism, a secondary punch mechanism adapted to punch out a core ring from a material and with the same operation seat the core ring in the channel gasket ring resting on the secondary die mechanism, a finishing die mechanism for receiving the gasket ring with the core ring seated therein, and a finishing punch mechanism adapted to form the channel gasket ring around the core ring to form a finished gasket.

15. In a gasket making machine the combination with a spring impelled core die mechanism, slidable means for pushing a channel gasket ring thereon, and a core punch mechanism adapted with one operation to center the channel gasket ring, punch a core ring out of a material and seat said core ring in said channel gasket ring.

16. In a gasket making machine the combination with a spring controlled movable die mechanism for receiving a channel gasket ring seated thereon, of a punch mechanism adapted when lowered to first punch a core ring from a material, then center the channel gasket ring and with the same operation seat the core ring in said centered channel gasket ring.

17. In a gasket making machine the combination with an apertured die block, means for feeding a material thereover, a punch adapted to co-act with said die block to punch a circular disk from said material, an adjustable die member, a spring therebelow for normally holding the same in elevated position, slidable means for pushing a gasket ring onto said adjustable die member, a punch sleeve, means for operating the same to punch a core ring from the material and with the same operation force said core ring to seat in the gasket ring on said adjustable die member, and a centering device in said punch sleeve for centering the gasket ring before the core ring is seated therein.

18. In a gasket making machine the combination with a finishing die sleeve, of slidable means for pushing a channel gasket ring having a core ring seated therein onto said die sleeve, a punch sleeve having a finishing groove therein, a centering device adjustable in said punch sleeve, and means for operating said punch sleeve whereby said centering device projects through the gasket ring to center the same and then co-acts with said punch sleeve to bend the flanges of the gasket ring toward each other to enclose the core ring to form a finished cored gasket.

19. In a gasket making machine the combination with a finishing die sleeve, a plate slidably mounted in said die sleeve, a spring for holding the same in elevated position, means for pushing a channel gasket ring having a core ring seated therein onto said die sleeve, a spring controlled finishing punch sleeve above said die sleeve, a finishing and centering plunger slidably mounted within said punch sleeve, said punch sleeve having grooves therein, means for operating said punch sleeve and said centering plunger whereby the centering plunger first projects through said gasket ring to center the same and then co-acts with said punch sleeve to bend the flanges of the gasket ring toward each other to enclose the core ring to form a finished cored gasket, and a spring in said punch sleeve adapted to draw the centering plunger into said punch sleeve to force air from said punch sleeve grooves to blow the finished gasket from engagement with said punch sleeve and plunger when the operating means is withdrawn.

20. In a gasket making machine the combination with a die mechanism, of a plate slidably mounted therein, resilient means for holding said plate in its elevated position to permit an article to be moved onto said die mechanism, a punch mechanism above said die mechanism, and a centering device slidably mounted in said punch mechanism adapted to center the article on the die mechanism before the punch mechanism acts on said article.

21. In a gasket making machine the combination with punch and die mechanisms, of means for blowing a finished article from said punch mechanism after a punching operation.

22. In a gasket making machine a main die block, a die mechanism mounted therein, an auxiliary block mounted on said main die block, a punch mechanism supported in said auxiliary block above said die mechanism, a movable main punch block, means for operating the same, and a member adjustably engaged in said main punch block adapted to engage said punch mechanism to force the same into co-acting relation with said die mechanism when said main punch block descends.

23. In a gasket making machine a main die block, a die mechanism therein, an auxiliary block secured on said main die block, a spring controlled punch member slidably mounted in said auxiliary block, a spring controlled centering member slidable in said punch member, a main punch block, means for operating the same, an adjustable member engaged in said main punch block and projecting therefrom, and means for locking said adjustable member in an adjusted position to permit the same when the main punch block descends to first actuate said centering member to cause the same to center an article on said die mechanism and then actuate the punch member to cause the same to act on the centered article on the die mechanism.

24. In a gasket making machine a die block, a die mechanism therein, means for causing one article to push another article onto said die mechanism, a slotted auxiliary block secured on said die block, a centering plate slidably mounted on said die block, a spring for operating the same to cause the centering plate to hold one of said articles in the field of operation of said die mechanism and holding another article following the first article out of the field of operation of the die mechanism, said centering plate having an inclined surface and an opening therein, a punch mechanism mounted in said auxiliary block, a centering device in said punch mechanism, a main punch block, means for operating the same, an actuating member projecting from the main punch block, and a rod secured to said main punch block adapted with the descent of the main punch block to first engage the inclined surface of the centering plate to retract the same and then project through the opening thereof to hold the plate in retracted position, said actuating member on the main punch block adapted to first operate the punch centering device to center the article on the die mechanism and then actuate the punch mechanism to cause the same to act on the centered article on the die mechanism.

25. In a gasket making machine the combination with die and punch mechanisms, of means for causing one channel gasket ring to push another channel gasket ring into the field of operation of said die and punch mechanisms, and spring controlled means for releasably holding the first mentioned channel gasket ring from moving into the field of operation of said die and punch mechanisms.

26. In a gasket making machine the combination with die and punch mechanisms, of means adapted to cause one article to move another article into the field of operation of said die and punch mechanisms, and means for holding the first mentioned article from entering the field of operation of the die and punch mechanisms until after the article in the field of operation of the die and punch mechanisms has been acted upon.

27. The combination with a gasket making machine, of means for operating the same to produce gaskets, a control lever for governing the operating means, a latch mechanism adapted to hold the control lever in place when the same is moved into position to throw in the operating means, ejector means for moving the formed gaskets through the machine, and safety means connected between said ejector means and with said latch mechanism adapted when the ejector means encounters an obstruction in the machine to be automatically released to cause retraction of said latch mechanism to release the control lever to stop the machine.

In testimony whereof we have hereunto subscribed our names in the presence of two subscribing witnesses.

WILLIAM P. ZOMMER.
GEORGE F. MAGDZIARZ.

Witnesses:
FRED E. PAESLER,
JOHN HASKE.